(12) United States Patent
Makida et al.

(10) Patent No.: US 7,997,887 B2
(45) Date of Patent: Aug. 16, 2011

(54) CUTTER DEVICE

(75) Inventors: Tetsuo Makida, Hiroshima (JP); Hideo Kubo, Hiroshima (JP); Kenji Nishimoto, Hiroshima (JP); Yoshitaka Yamada, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 301 days.

(21) Appl. No.: 12/343,908

(22) Filed: Dec. 24, 2008

(65) Prior Publication Data

US 2009/0169665 A1 Jul. 2, 2009

(30) Foreign Application Priority Data

Dec. 27, 2007 (JP) .................................. 2007-336858

(51) Int. Cl.
*B26B 1/00* (2006.01)
*B26D 1/00* (2006.01)

(52) U.S. Cl. ........................ 425/202; 425/311; 425/313

(58) Field of Classification Search ............... 83/698.41, 83/835; 425/142, 202, 294, 307, 309, 311, 425/313

See application file for complete search history.

(56) References Cited

U.S. PATENT DOCUMENTS

| | | | | |
|---|---|---|---|---|
| 3,196,487 A | * | 7/1965 | Snelling | 425/168 |
| 3,564,650 A | * | 2/1971 | Irving | 425/72.1 |
| 3,599,285 A | * | 8/1971 | Hamilton | 425/307 |
| 3,749,539 A | * | 7/1973 | Galbreath et al. | 425/313 |
| 4,564,350 A | * | 1/1986 | Holmes et al. | 425/313 |
| 4,698,009 A | * | 10/1987 | Marin et al. | 425/196 |
| 5,110,523 A | * | 5/1992 | Guggiari | 264/40.5 |
| 5,358,399 A | * | 10/1994 | Ogoshi et al. | 425/311 |
| 5,624,688 A | * | 4/1997 | Adams et al. | 425/67 |
| 7,267,540 B2 | * | 9/2007 | Fridley et al. | 425/313 |
| 7,470,118 B2 | * | 12/2008 | Fukutani et al. | 425/67 |
| 2003/0161909 A1 | * | 8/2003 | Corry et al. | 425/308 |
| 2003/0213352 A1 | | 11/2003 | Konno et al. | |

FOREIGN PATENT DOCUMENTS

| | | |
|---|---|---|
| DE | 2638126 A1 | 3/1978 |
| DE | 19642389 A1 | 4/1997 |
| JP | 2642579 B2 | 5/1997 |
| JP | 2000-301532 A | 10/2000 |
| JP | 2003-326519 A | 11/2003 |

OTHER PUBLICATIONS

Extended European Search Report dated Apr. 14, 2009.

* cited by examiner

*Primary Examiner* — Yogendra N Gupta
*Assistant Examiner* — Emmanuel S Luk
(74) *Attorney, Agent, or Firm* — Sughrue Mion, PLLC

(57) ABSTRACT

A cutter device includes a fixing holder, a spherical cylinder, and a cutter holder. The fixing holder has a through hole, and a spherical outer circumferential surface in which a key groove is formed. The spherical cylinder includes a through hole that has a spherical inner circumferential surface in which a key groove having a spherical bottom surface is formed, and a spherical outer circumferential surface having a key groove formed at a position shifted around a rotational axis with respect to the key groove. The cutter holder includes a through hole that has a spherical inner circumferential surface in which a through hole having a spherical bottom surface is formed, and a cutter blade. These components are rotationally slidably connected by keys.

7 Claims, 14 Drawing Sheets

CUTTER DEVICE

This application claims priority from Japanese Patent Application No. 2007-336858, filed on Dec. 27, 2007, the entire subject matter of which is incorporated herein by reference.

BACKGROUND OF THE INVENTION

1. Field of the Invention

The present invention relates to a cutter device for use in resin-pelletizing.

2. Description of the Related Art

FIG. 9 illustrates a partial side cross-sectional view of a granulating apparatus using a general cutter device. Further, FIG. 10 illustrates a partial side cross-sectional view of an example of a fixed type cutter holder.

The cutter device cuts melted resin extruded from a die 100 using a rotationally driven cutter blade 101. Consequently, a pellet is obtained. A cutter holder 106 provided with a cutter blade 101 is fixed to a cutter shaft 102 with a fixing bolt 107.

It is necessary for obtaining a favorable pellet to maintain a die surface 100a and the cutter blade 101 in a parallel condition during the cutter device is operated. Thus, before the cutter device is operated, or each time when the cutter blade 101 is replaced with a new one, accuracy adjustment between the die surface 100a and the cutter shaft 102 is performed. However, it takes time to obtain target accuracy by the accuracy adjustment. Even in a case where the cutter device is operated by adjusting the accuracy therebetween to the target accuracy, the parallelism between the die surface 100a and the cutter blade 101 may be changed due to subtle change in temperature during an operation of peripheral equipment. Accordingly, sometimes, a cutting failure is caused.

Thus, in order to solve these problems, a method has been proposed, which utilizes a spherical element to provide an aligning function to the cutter holder to thereby maintain the parallelism between the die and the cutter blade during an operation of the cutter device.

FIG. 11 illustrates a side cross-sectional view of a granulating apparatus disclosed in Japanese Patent No. 2642579. The granulating apparatus disclosed in Japanese Patent No. 2642579 utilizes an elastic force of a plate spring 201 to ensure alignability of a movable portion.

On the other hand, another method has been provided, which utilizes a spherical element to provide an aligning function to the cutter holder thereby to maintain the parallelism between the die and the cutter blade even during an operation of the cutter device. FIG. 12 illustrates a related granulating apparatus disclosed in JP-A-2000-301532. FIG. 13 illustrates a related granulating apparatus disclosed in U.S. Pat. No. 5,624,688. FIGS. 14 and 15 illustrate a related granulating apparatus disclosed in JP-A-2003-326519.

The cutter devices disclosed in JP-A-2000-301532 and U.S. Pat. No. 5,624,688 use balls 210 and 310 so as to have the aligning function. Further, the cutter device disclosed in JP-A-2003-326519 uses pins 410 so as to have the aligning function. Further, JP-A-2003-326519 also discloses another example in which a rubber bush 207 is inserted into between the cutter shaft 202 and the cutter holder 206 as an elastic member, as illustrated in FIG. 15.

However, in the case of the devices disclosed in JP-A-2000-301532 and U.S. Pat. No. 5,624,688, the transmission of large torque is difficult, because the balls are used as torque transmission members. Further, in the case of the device disclosed in JP-A-2003-326519, the torque transmission members are pins (or shafts), which are more favorable than the balls and are still unsuitable for the transmission of large torque.

As described above, torque transmission portions serving as means for ensuring flexibility in the holder, to which the cutter blade is attached, utilize point contact or line contact. Thus, when the transmission of large torque is performed, breakage of the ball and deformation of the pin (or shaft) may occur. In addition, the related cutter devices described above have problems in that the life of each of these torque transmission members is short, and that the exchange frequency thereof is high. Hereinafter, the problems of the related cutter devices are described more particularly.

According to JP-A-2000-301532, the device disclosed therein is such that "a cutter holder is provided on a cutter shaft via a flexible joint that is displaceable in a shaft center direction." However, no more particular description of a flexible mechanism of the joint is described in JP-A-2000-301532. However, according to the description of an embodiment of the device, it is clear that rotary torque is transmitted via a ball. That is, the transmission of rotary torque is performed utilizing point contact. When a large turning force is transmitted, a dent is generated in a contact surface of the ball. Thus, the generated dent prevents the ball from moving smoothly. As a result, the flexible performance is limited. Thus, the problems of generation of vibrations and impossibility of pelletization may occur. Accordingly, the structure disclosed in Japanese Patent No. 2642579 is unsuitable for transmission of large torque.

Similarly, the cutter device disclosed in U.S. Pat. No. 5,624,688 uses the balls as the torque transmission portion, as described above. Thus, the transmission of large torque cannot be achieved.

The device disclosed in JP-A-2003-326519 is constructed so that rotary torque is transmitted by the pin (cylindrical element) or a spherical element. In addition, a force which acts in a cutter shaft center direction is transmitted also by the same pin. Consequently, a burden is imposed on the pin. Further, because the rotary torque is received by the line contact between the pin and a pin hole, the device disclosed in JP-A-2003-326519 is unsuitable for transmission of a large force. Moreover, when a large force is continuingly added to this device during an operation thereof, what is called a "drooping" is generated on the pin or the pin hole. Thus, rattling is caused. Further, vibrations occur due to accuracy failure. Moreover, pelletizing performance failure and flexibility failure are caused. Furthermore, cutoff of the pin is caused. Finally, breakage of the cutter device itself may occur. Thus, even in the case of the structure disclosed in JP-A-2003-326519, it is difficult to continuingly maintain flexibility and favorably perform pelletizing while large torque is transmitted.

Thus, the related flexible holders utilizing the spherical elements do not have a structure enabling the transmission of large torque. Therefore, the related flexible holders cannot exercise functions sufficient to meet demands for realizing high-functions of the device and for increasing the size thereof.

SUMMARY OF THE INVENTION

An object of the invention is to provide a cutter device having an aligning function, which can achieve the transmission of large torque.

According to a first aspect of the invention, there is provided a cutter device comprising: a cutter shaft; a fixing holder comprising: a first through hole that holds the cutter shaft; and a fixing-holder-side engaging portion on a spherical outer circumferential surface thereof; a spherical cylinder comprising: a second through hole, which includes a first spherical-cylinder-side engaging portion provided on an inner circumferential surface thereof, and which holds the fixing holder; and a second spherical-cylinder-side engaging portion provided on a spherical outer circumferential surface thereof at a position shifted around a rotational axis with respect to the first spherical-cylinder-side engaging portion; and a cutter holder comprising: a third through hole, which includes a cutter-holder-side engaging portion provided on an inner circumferential surface thereof, and which holds the spherical cylinder; and a plurality of cutter blades for cutting resin, wherein the fixing holder and the spherical cylinder are connected to each other by surface contact between the fixing-holder-side engaging portion and the first spherical-cylinder-side engaging portion so that rotary torque of the fixing holder is transmittable to the spherical cylinder, the fixing holder and the spherical cylinder being turnable to each other in a direction intersecting with a direction in which the rotary torque of the fixing holder is transmitted, and wherein the spherical cylinder and the cutter holder are connected to each other by surface contact between the second spherical-cylinder-side engaging portion and the cutter-holder-side engaging portion so that rotary torque of the spherical cylinder is transmittable to the cutter holder, the spherical cylinder and the cutter holder being turnable to each other in a direction intersecting with a direction in which the rotary torque of the spherical cylinder is transmitted.

As described above, the cutter device of the invention has an aligning function by being constructed so that the spherical cylinder and the cutter holder are held to each other on the spherical surfaces thereof. In addition, the cutter device of the invention can transmit large torque by being constructed so that a torque transmission portion utilizes surface contact, instead of point contact and line contact.

According to a second aspect of the invention, at least one of the inner circumferential surface of the spherical cylinder and the inner circumferential surface of the cutter holder have a spherical surface.

According to a third aspect of the invention, in the cutter device, at least one of an end part of the inner circumferential surface of the spherical cylinder and an end part of the inner circumferential surface of the cutter holder have a truncated-cone-like shape.

According to a fourth aspect of the invention, a connection between the fixing-holder-side engaging portion and the first spherical-cylinder-side engaging portion, and that between the second spherical-cylinder-side engaging portion and the cutter-holder-side engaging portion are a key-connection.

According to a fifth aspect of the invention, a connection between the fixing-holder-side engaging portion and the first spherical-cylinder-side engaging portion, and that between the second spherical-cylinder-side engaging portion and the cutter-holder-side engaging portion are a spline-connection.

According to a sixth aspect of the invention, an outer shape of each of the fixing holder and the spherical cylinder has a truncated-cone-like shape, the side surface of which has a spherical shape.

According to a seventh aspect of the invention, each of the fixing-holder-side engaging portion and the first spherical-cylinder-side engaging portion has a torque transmission sliding surface, each of which slides on one another so as to transmit rotary torque of the fixing holder from the fixing-holder-side engaging portion to the first spherical-cylinder-side engaging portion, each of the second spherical-cylinder-side engaging portion and the cutter-holder-side engaging portion has a torque transmission sliding surface, each of which slides on one another so as to transmit rotary torque of the spherical cylinder from the second spherical-cylinder-side engaging portion to the cutter-holder-side engaging portion, and a surface treatment for reducing a frictional coefficient of a surface is performed on respective torque transmission sliding surfaces.

In other words, the cutter device of the invention can be configured so that a surface treatment for reducing a frictional coefficient of a surface is performed on torque transmission sliding surfaces of the fixing-holder-side engaging portion and the first spherical-cylinder-side engaging portion, which transmit rotary torque of the fixing holder from the fixing-holder-side engaging portion to the first spherical-cylinder-side engaging portion and slide on each other, and on torque transmission sliding surfaces of the second spherical-cylinder-side engaging portion and the cutter-holder-side engaging portion, which transmit rotary torque of the spherical cylinder from the second spherical-cylinder-side engaging portion to the cutter-holder-side engaging portion.

According thereto, it is possible to suppress reduction in torque transmission efficiency. In addition, the life of components can be increased.

According to the invention, a cutter device having an aligning function is enabled to transmit large torque.

DETAILED DESCRIPTION OF THE PREFERRED EMBODIMENTS

Figure 1A:
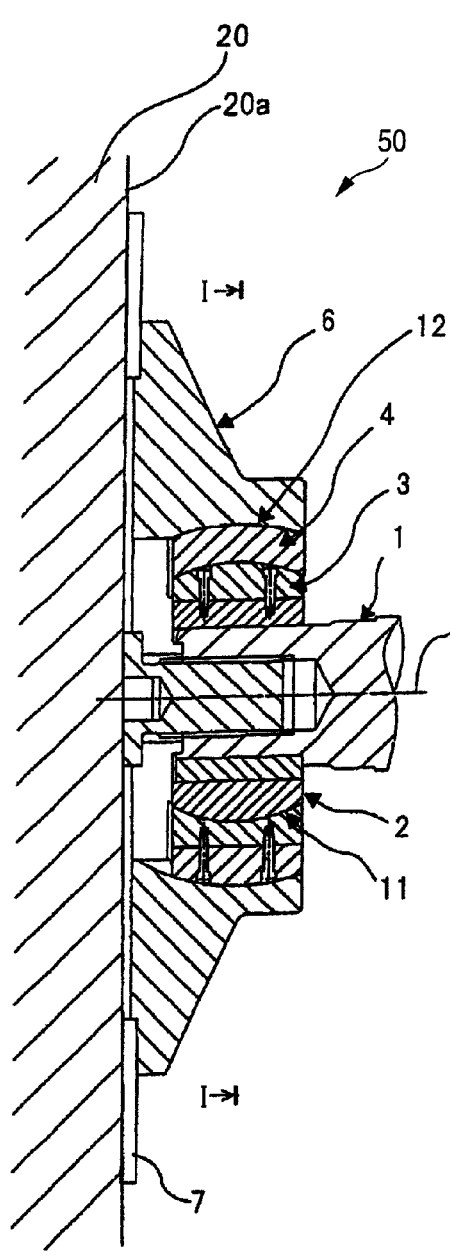
FIG. 1A is a side cross-sectional view illustrating a cutter device according to the invention.
Figure 1B:
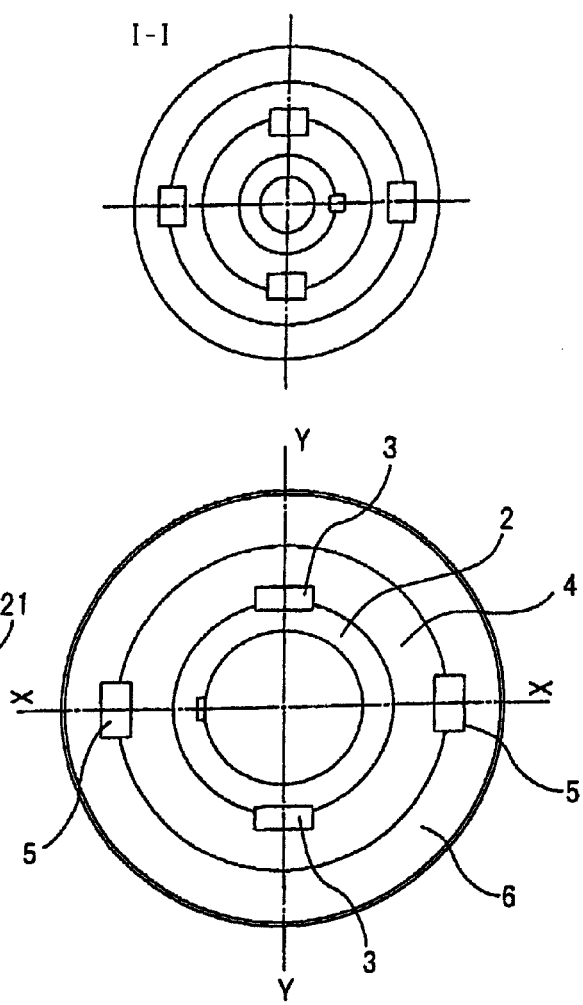
FIG. 1B is a view taken in the direction of arrows I-I shown in FIG. 1A.
Figure 2:
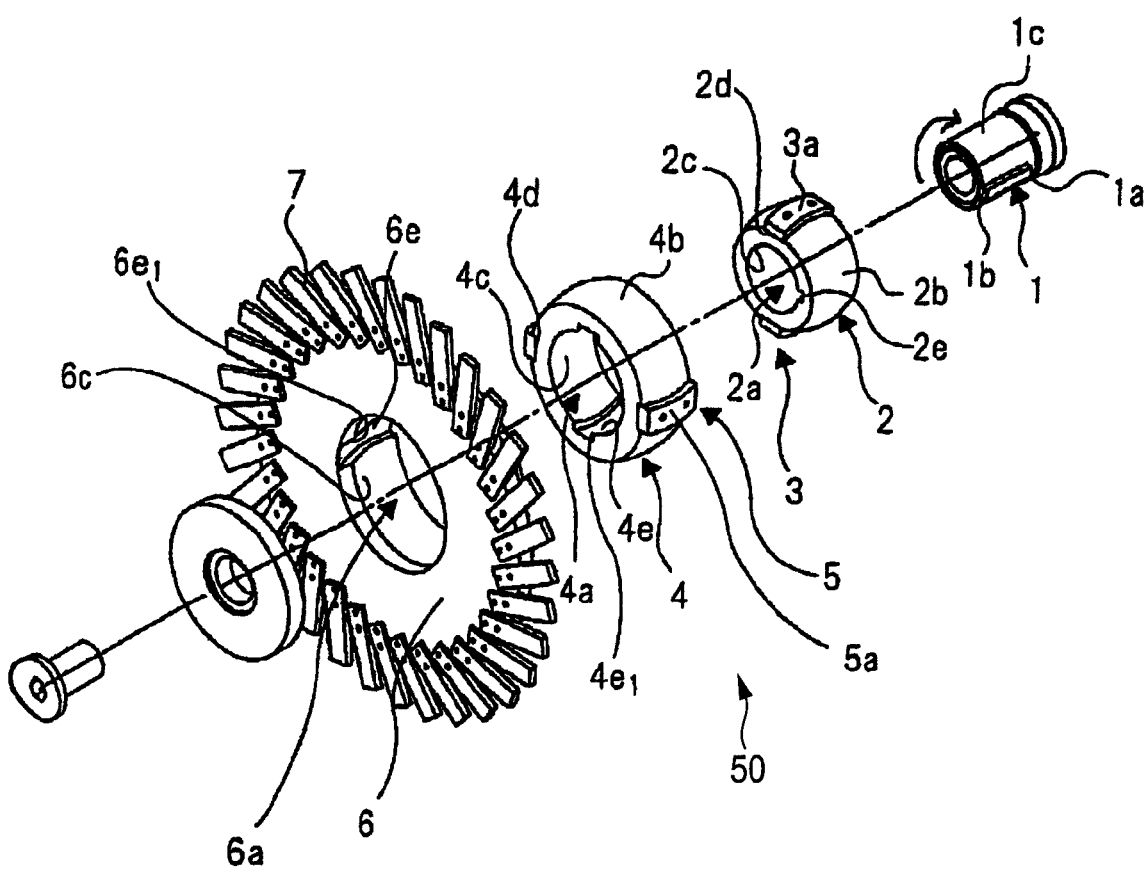
FIG. 2 is an exploded perspective view illustrating a cutter device according to the invention.

FIG. 1A illustrates a side cross-sectional view of a cutter device 50 according to the invention. FIG. 1B illustrates a view taken in the direction of arrows I-I shown in FIG. 1A. Further, FIG. 2 illustrates an exploded perspective view of a cutter device 50 according to the invention.

The cutter device 50 according to the invention includes a driving force transmission mechanism of a spherical structure.

The driving force transmission mechanism has an aligning function of transmitting a rotation driving force of a cutter shaft 1 to a cutter holder 6. The driving force transmission mechanism includes a fixing holder 2, keys 3, a spherical cylinder 4, and keys 5.

The structure of each component of the driving force transmission mechanism of the cutter device 50 of the invention will be described below.

A key groove 1b extending in an axial direction is formed in an outer circumferential surface 1c of the cutter shaft 1. A key 1a is fit into the key groove 1b.

The fixing holder 2 is a member into which the cutter shaft 1 is inserted. Further, the fixing holder 2 itself is internally inserted into a spherical cylinder 4 and transmits a driving force of the cutter shaft 1 to the spherical cylinder 4. A through hole 2a is formed in the fixing holder 2. The cutter shaft 1 is inserted into the through hole 2a. The through hole 2a functions as a first through hole. A key groove 2e is formed in the inner circumferential surface 2c of the through hole 2a. A key 1a of the cutter shaft 1 is fit into the key groove 2e. Further, an outer circumferential surface 2b of the fixing holder 2 has a spherical shape. Two key grooves 2d are formed in the outer circumferential surface 2b so as to extend in an axial direction. The key grooves 2d are formed at positions that are symmetrical with each other with respect to a central axis thereof.

Keys 3 are fit into the key grooves 2d of the fixing holder 2, respectively. Thus, a fixing-holder-side engaging portions is constructed. Each of top surfaces 3a of the keys 3, among surfaces thereof protruded from the key grooves 2d, can be a cylindrical surface or a flat surface, in addition to a spherical surface. Even in a case where each of the top surfaces 3a is a flat surface, the fixing holder 2 can rotationally slide with respect to the spherical cylinder 4 by providing a gap between a bottom surface $4e_1$ of a key groove 4e (described below) and the top surface 3a. Incidentally, in a case where the shapes of the top surfaces 3a are set to be spherical shapes, the spherical top surfaces 3a are more advantageous than cylindrically shaped top surfaces and flat top surfaces in that the area of each torque transmission surface can be maximized, on condition that the areas of the spherical top surfaces, than cylindrical top surfaces and the flat top surfaces are equal to one another. The keys 3 are fixed to the fixing holder 2 with a bolt or the like.

The spherical cylinder 4 is a member into which the fixing holder 2 is internally inserted. The spherical cylinder 4 itself is inserted into the cutter holder 6 and transmits to the cutter holder 6 the driving force which has been transmitted to the fixing holder 2. A through hole 4a is formed in the spherical cylinder 4. The through hole 4a functions as a second through hole. An inner circumferential surface 4c of the through hole 4a has a spherical shape. Two key grooves 4e extending in an axial direction are formed in the inner circumferential surface 4c and configure a first spherical-cylinder-side engaging portion. The key grooves 4e are formed at positions that are symmetrical with each other with respect to the central axis. A part provided at the side of the top surface 3a of the key 3 fit into each of the key grooves 2d is fit into an associated one of the key grooves 4e. The bottom surface 4e1 of each of the key grooves 4e is machined by providing a gap between the bottom surface 4e1 and an associated one of the top surfaces 3a of the keys 3 so that each of the keys 3 can slide in an associated one of the key grooves 4e. The outer circumferential surface 4b of the spherical cylinder 4 is spherically shaped. Two key grooves 4d are formed in the outer circumferential surface 4b so as to extend in an axial direction. The key grooves 4d are formed at positions shifted from each other around the rotational axis of the spherical cylinder 4. In the present embodiment, the key grooves 4d are formed such that an imaginary line connecting the key grooves 4d bisects with another imaginary line connecting the key grooves 4e of the inner circumferential surface 4c at right angles. In addition, the key grooves 4d are formed at positions that are symmetrical with each other with respect to the central axis.

Keys 5 are fit into the key grooves 4d of the spherical cylinder 4, respectively, and configure a second spherical-cylinder-side engaging portion. The shape of each of top surfaces 5a of the keys 5, among surfaces thereof protruded from the key grooves 4d, can be spherical. The keys 5 are fixed to the spherical cylinder 4 with a bolt or the like.

Figure 3:
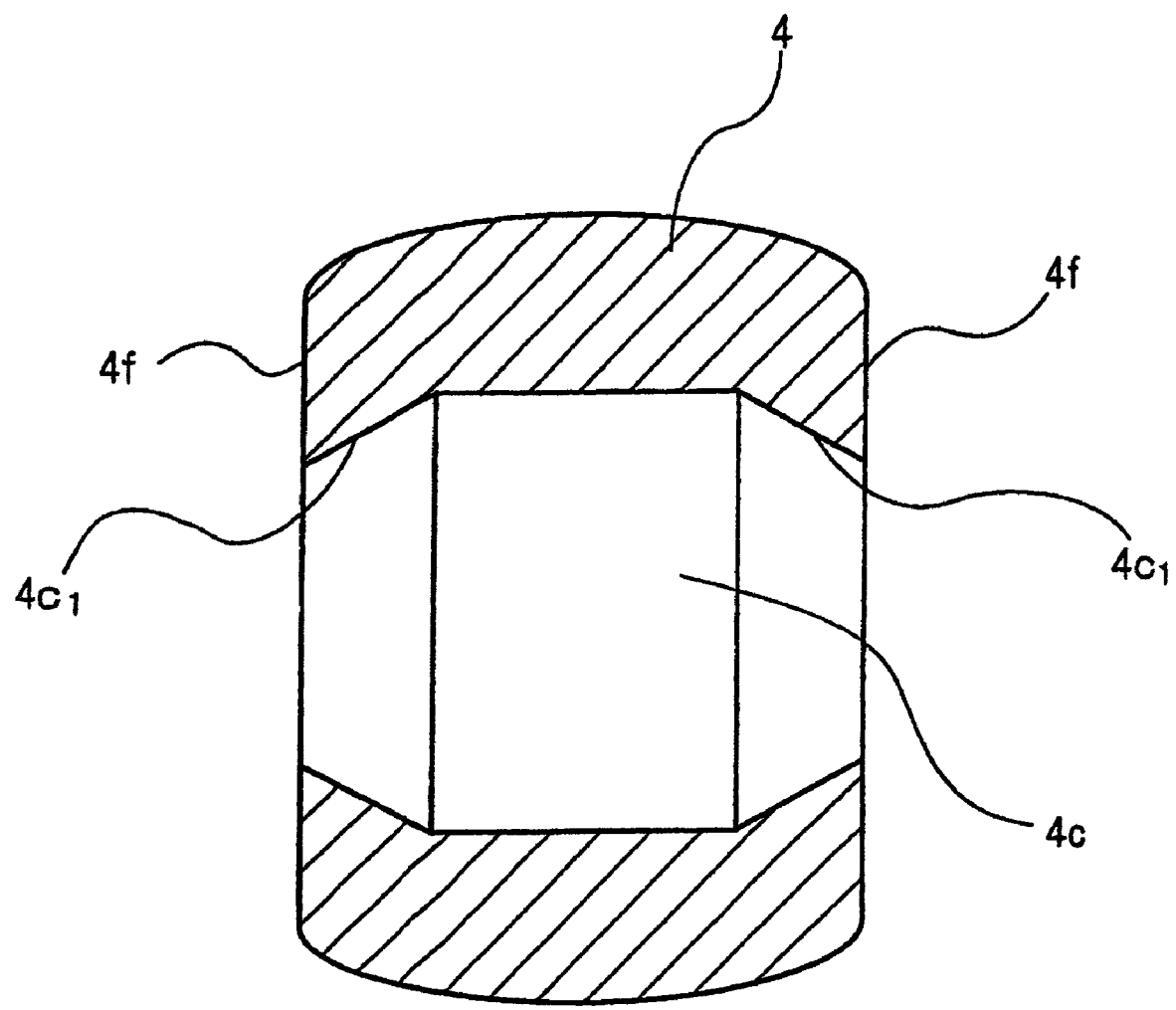
FIG. 3 is a cross-sectional view illustrating a spherical cylinder having a truncated-cone-like inner circumferential surface.

The inner circumferential surface 4c of the spherical cylinder 4 according to the present embodiment is not limited to the spherical shape. As illustrated in FIG. 3, a part of the inner peripheral surface 4c, which is provided at the side of each of end portions 4f, can be shaped like a truncated-cone-like surface $4c_1$, instead of a spherical surface.

Figure 4:
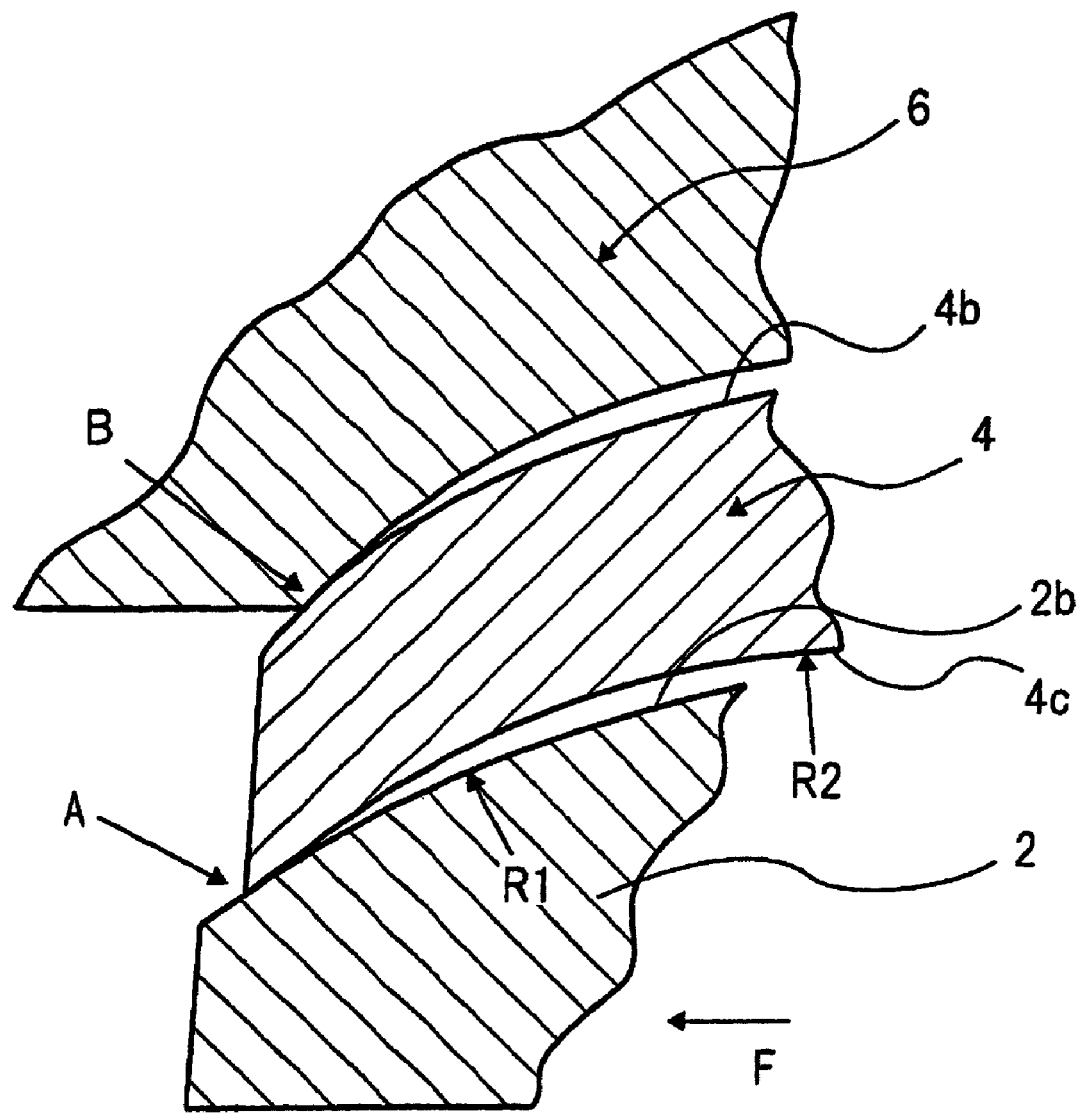
FIG. 4 is a partially enlarged cross-sectional view for explaining local stress generated in a case where the inner circumferential surface of a spherical cylinder is spherically shaped.
Figure 5:
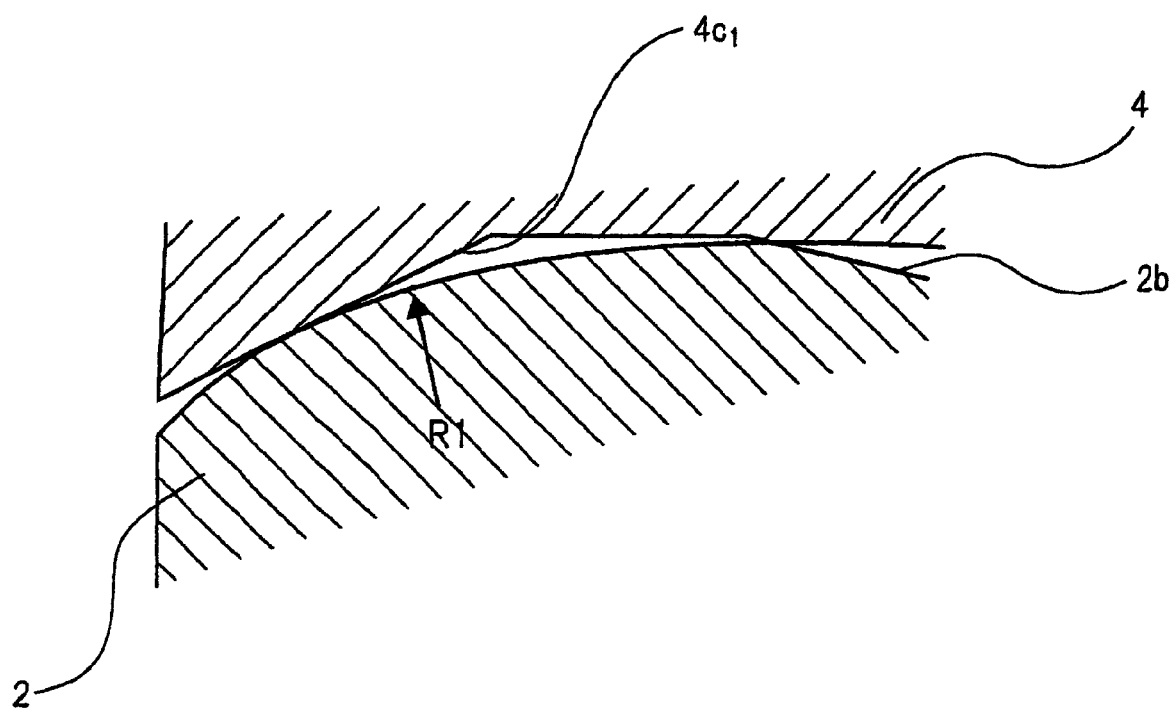
FIG. 5 is a partially enlarged cross-sectional view for explaining how stress is applied in the case where the inner circumferential surface of a spherical cylinder is shaped like a truncated cone.

Reasons for permitting the inner circumferential surface 4c to be shaped like a truncated-cone-like surface are described hereinafter with reference to FIGS. 4 and 5. FIG. 4 is a partially enlarged cross-sectional view for explaining local stress generated in a case where the inner circumferential surface of the spherical cylinder is spherically shaped. FIG. 5 is a partially enlarged cross-sectional view for explaining how stress is applied in the case where the inner circumferential surface of the spherical cylinder is shaped like a truncated cone.

First, local stress generated in the case of spherically shaping the inner circumferential surface of the spherical cylinder is explained hereinbelow. As illustrate in FIG. 4, in a case where a force acts in a direction designated with reference character F in this figure, the force is received at a point A, i.e., a corner portion macroscopically. This is a cause for generating local stress. In order to prevent the generation of local stress, it is necessary to make a radius R1 of the outer circumferential surface 2b of the fixing holder 2 to be less than a radius R2 of the inner circumferential surface 4c of the spherical cylinder 4.

On the other hand, in a case where the inner circumferential surface 4c of the spherical cylinder 4 is the truncated-cone-like surface 4c1 shown in FIG. 3, a state illustrated in an enlarged view in FIG. 5 is not caused, in which the corner portion of the inner circumferential surface 4c of the spherical cylinder 4 abuts on the outer circumferential surface 2b of the fixing holder 2. Thus, even in a case where the inner circumferential surface 4c of the spherical cylinder 4 is formed to be the truncated-cone-like surface $4c_1$, the generation of local stress can be prevented.

The cutter holder 6 has a plurality of cutter blades 7 provided on a circumference thereof. The cutter holder 6 is rotated by a rotation driving force transmitted from the spherical cylinder 4. Then, molten resin extruded from a die 20 is cut with the cutter blade 7, so that a pellet can be obtained. A through hole 6a is formed in the cutter holder 6. The through hole 6a functions as a third through hole. An inner circumferential surface 6c of the through hole 6 is spherically shaped. Two key grooves 6e extending in an axial direction are formed in the inner circumferential surface 6c. The key grooves 6e are formed at positions that are symmetrical with each other with respect to the central axis. The keys 5 of the spherical cylinder 4 are fit into the key grooves 6e, respectively. The bottom surface $6e_1$ of each of the key grooves 6e is machined into a spherical shape so that the associated key 5 can slide in this key groove 6e.

Figure 6:
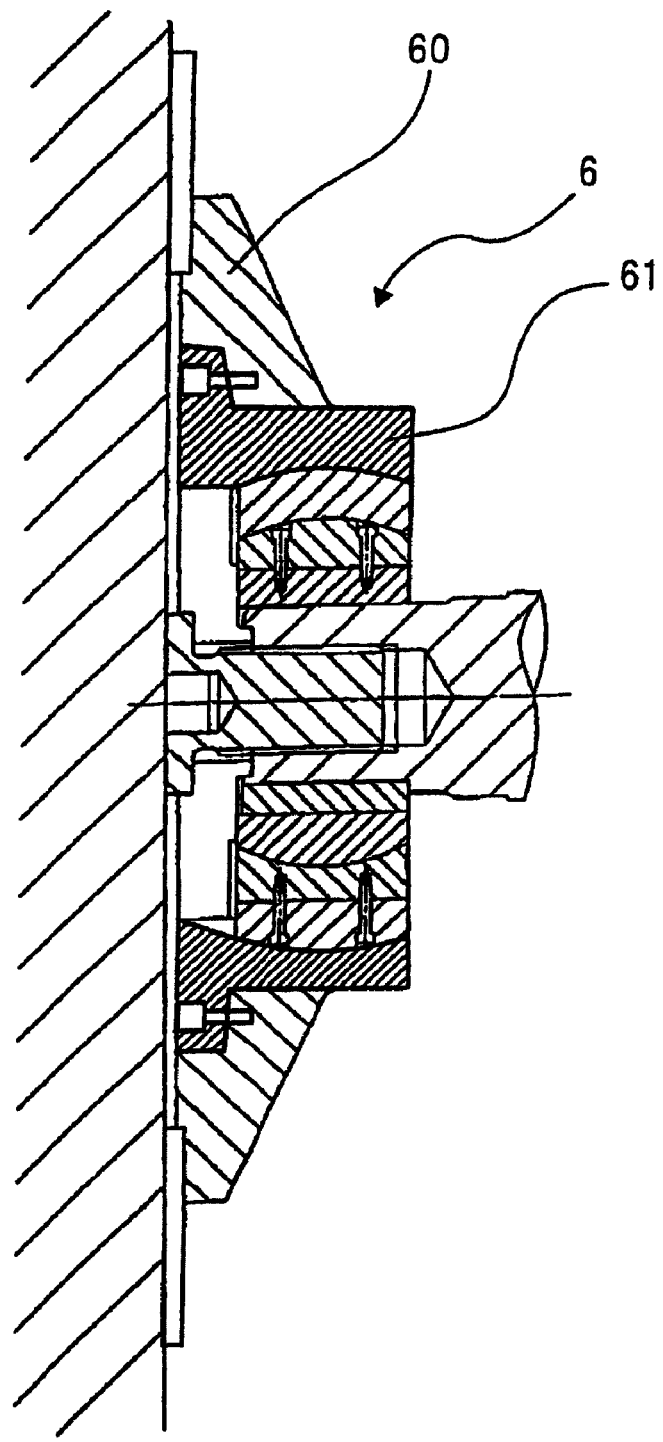
FIG. 6 is a cross-sectional view illustrating an example of a cutter holder including a cutter blade holder portion and a rocking holder.

Incidentally, the cutter holder 6 can be configured by connecting a cutter blade holder portion 60, which holds the cutter blade 7, to a rocking holder 61, which rockably holds the spherical cylinder 4, as illustrated in FIG. 6.

Figure 7:
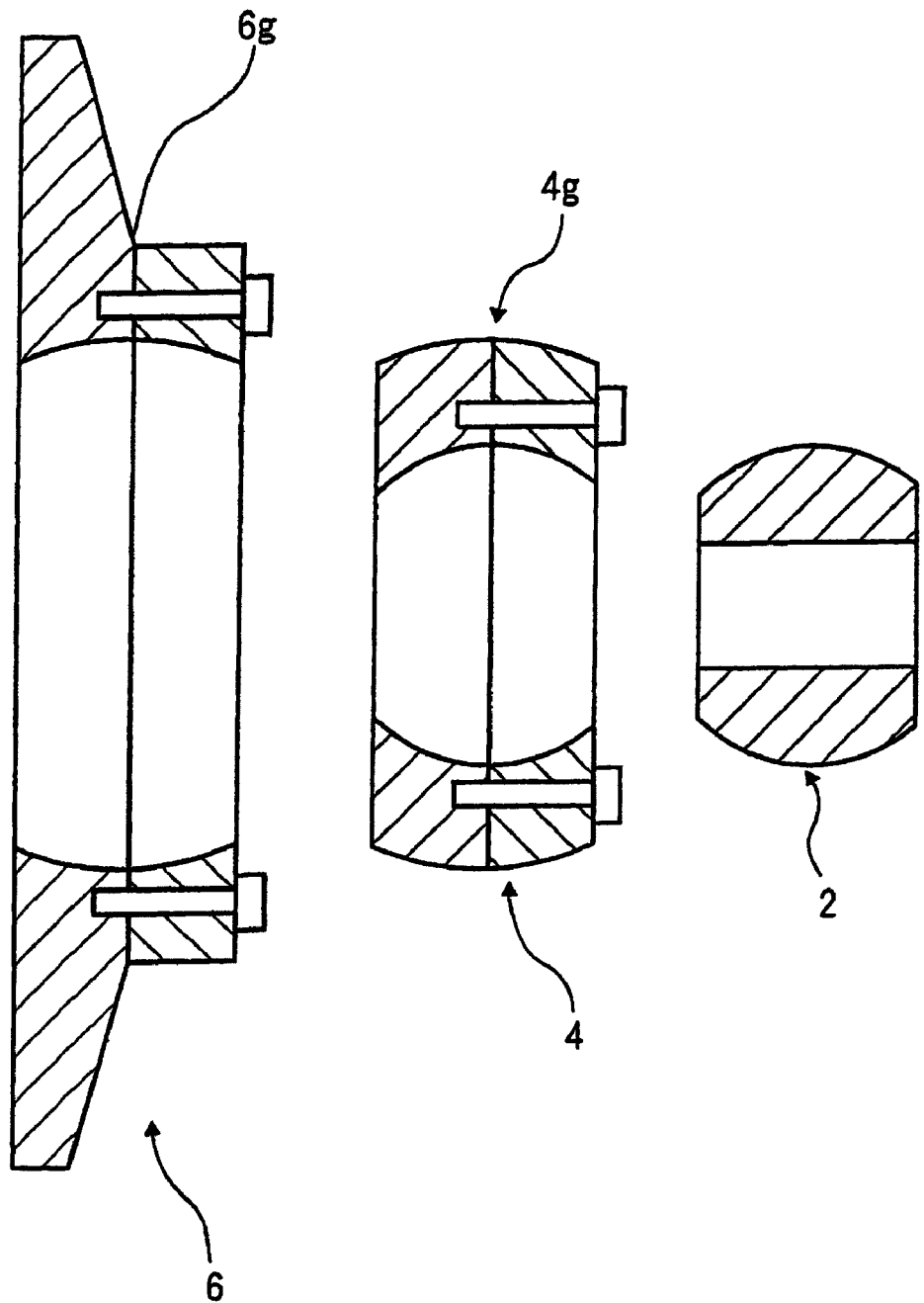
FIG. 7 is a cross-sectional view illustrating a spherical cylinder and a cutter holder, each of which is constructed dividably.
Figure 8:
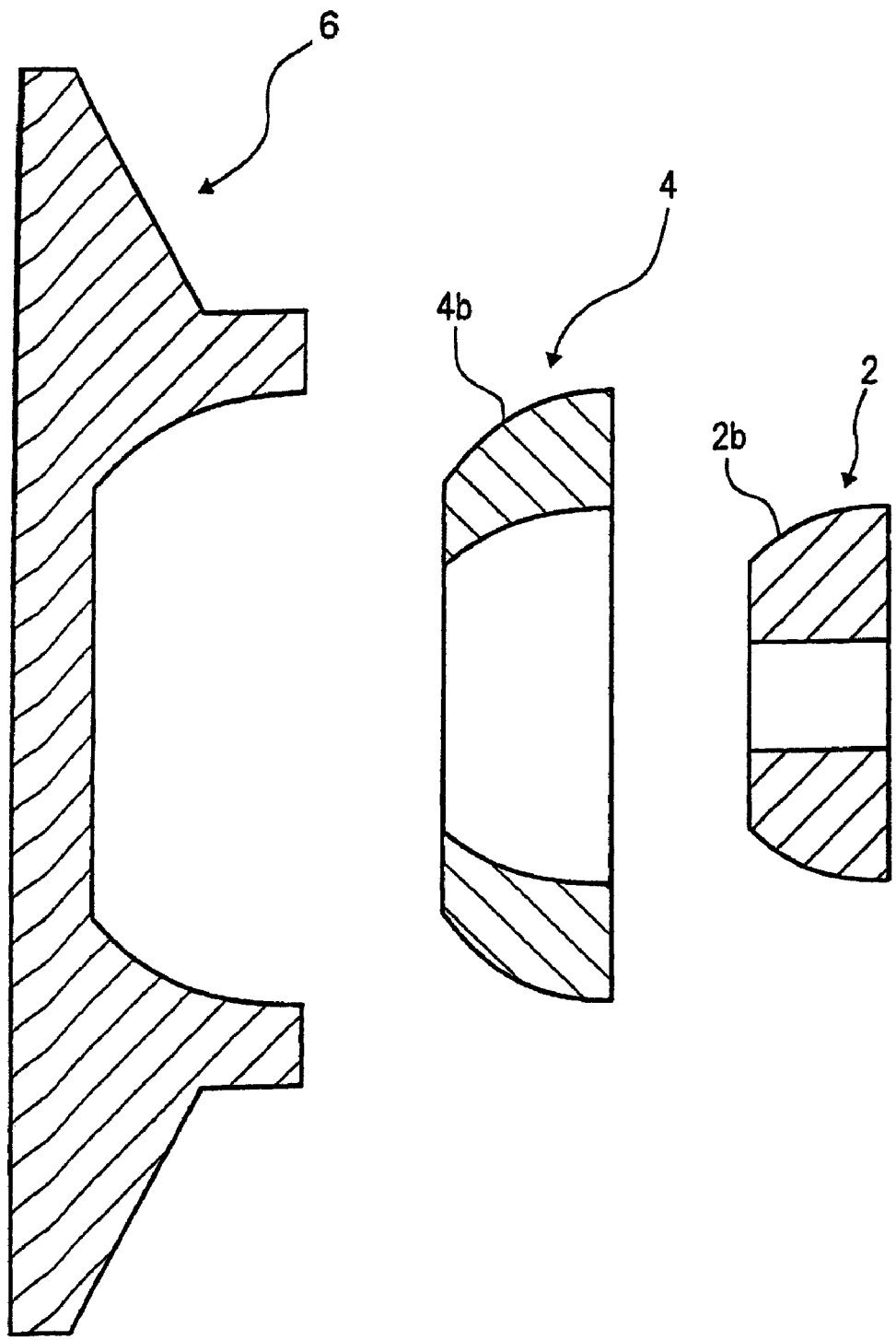
FIG. 8 is a cross-sectional view illustrating a fixing holder and a spherical cylinder, each of which is shaped like a truncated cone and has a spherical side surface.
Figure 9:
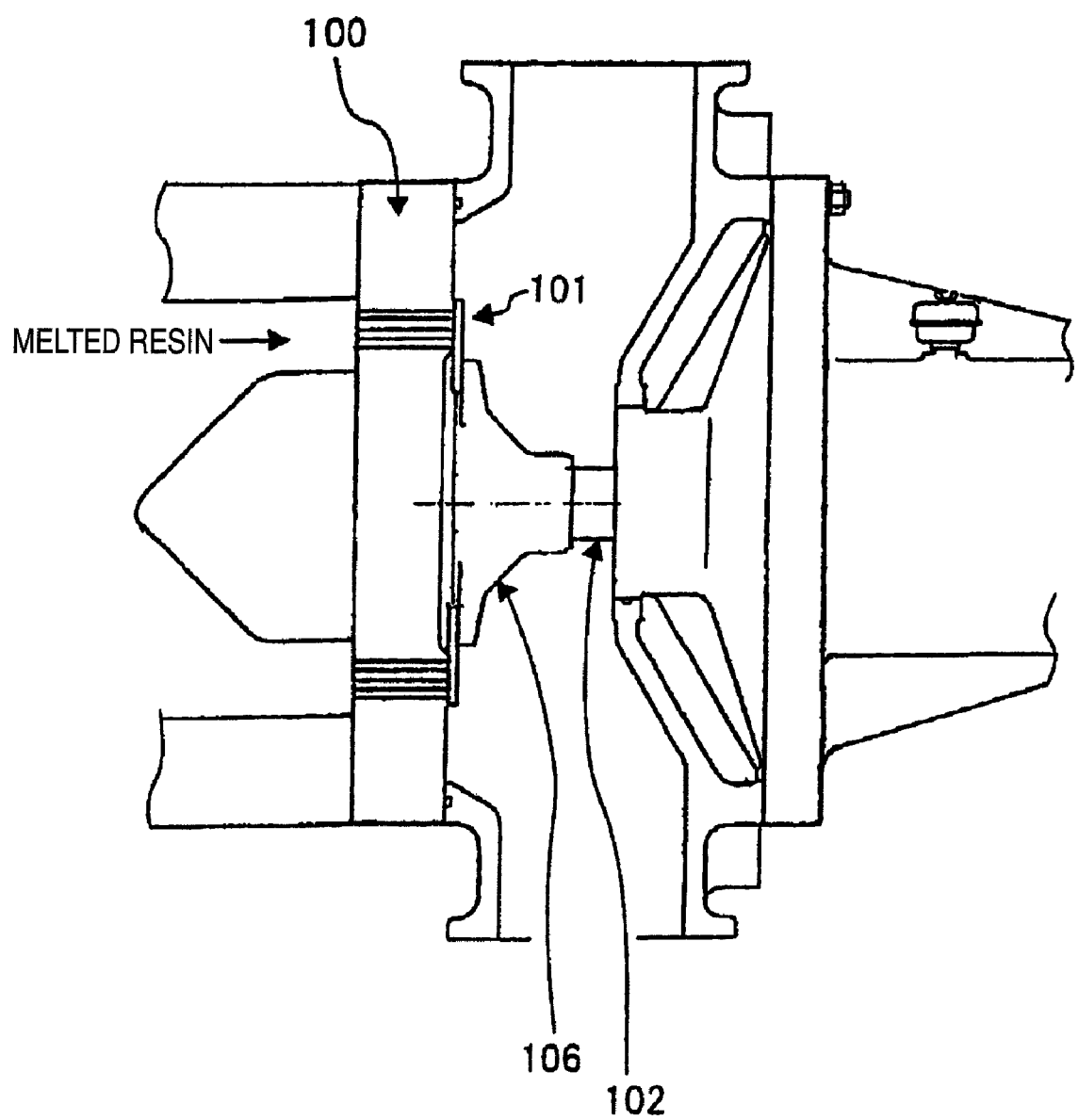
FIG. 9 is a partial side cross-sectional view illustrating a granulating apparatus using a general cutter device.
Figure 10:
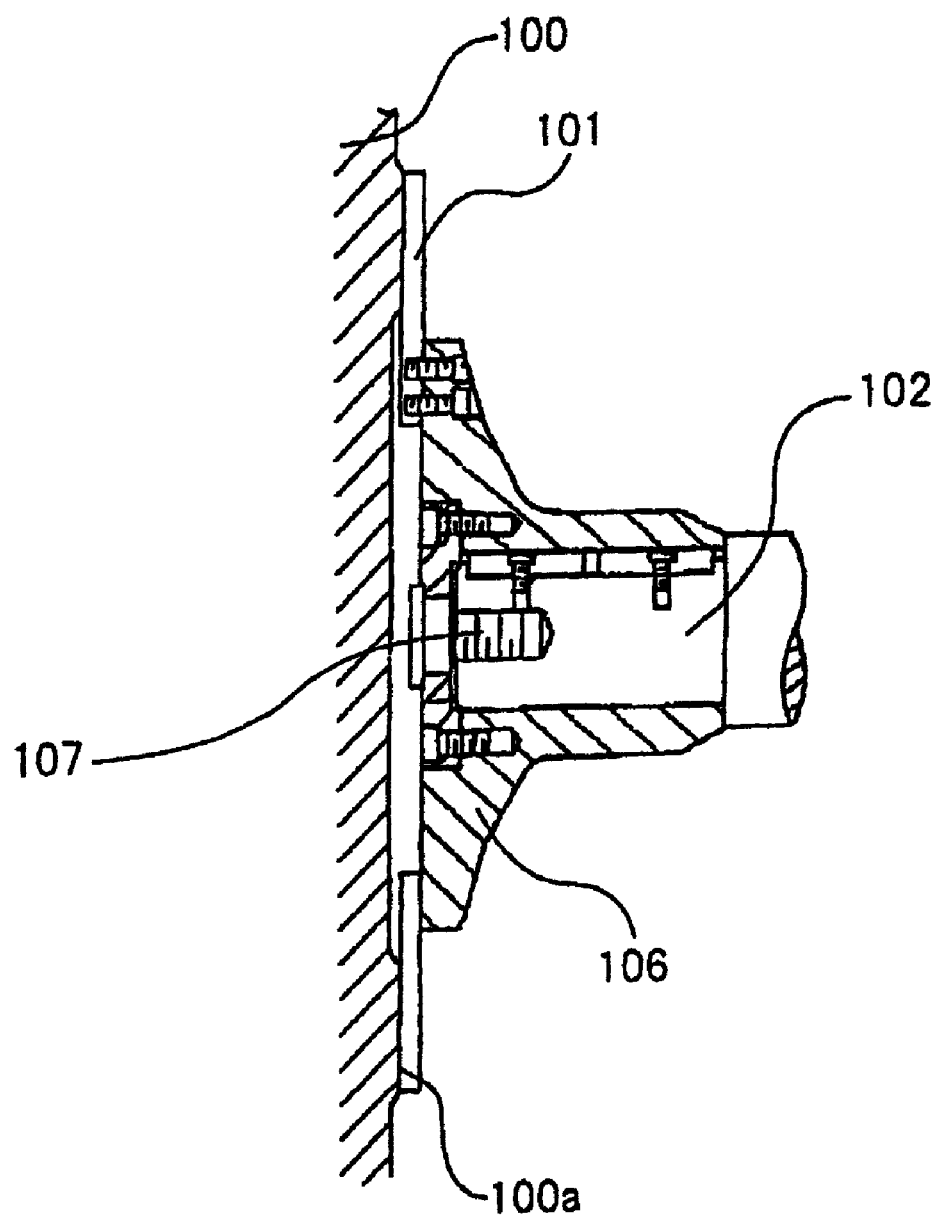
FIG. 10 is a side cross-sectional view illustrating an example of a fixed type cutter holder.
Figure 11:
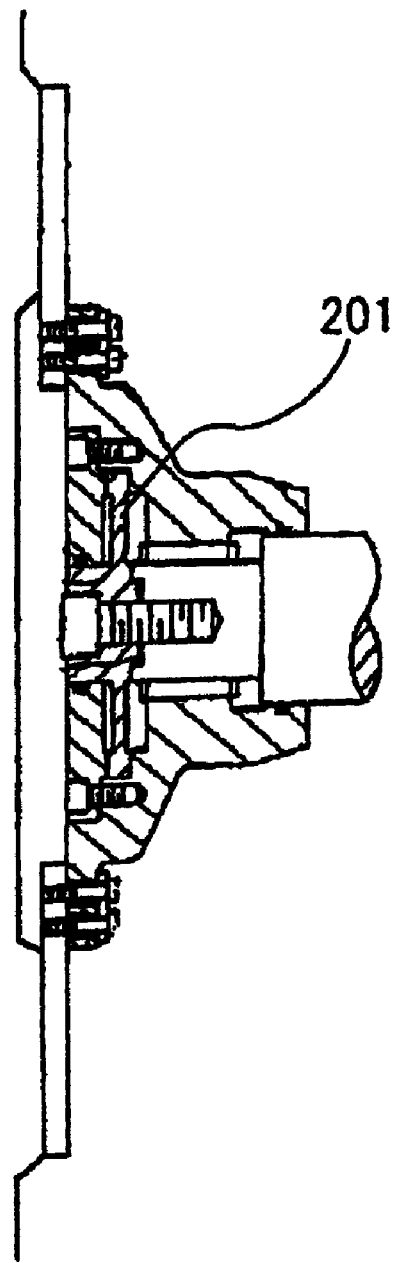
FIG. 11 is a side cross-sectional view illustrating a first related granulating apparatus.
Figure 12:
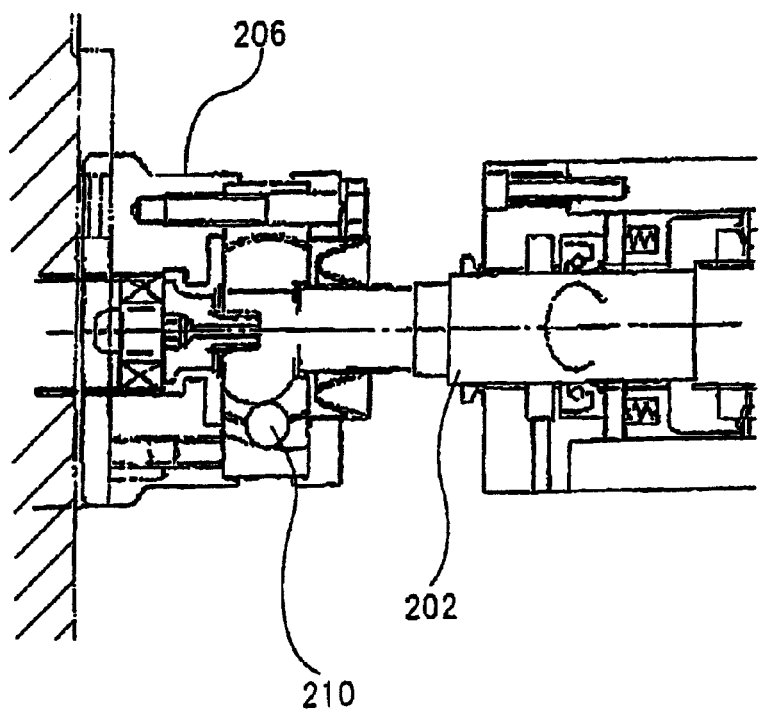
FIG. 12 is a side cross-sectional view illustrating a second related granulating apparatus.
Figure 13:
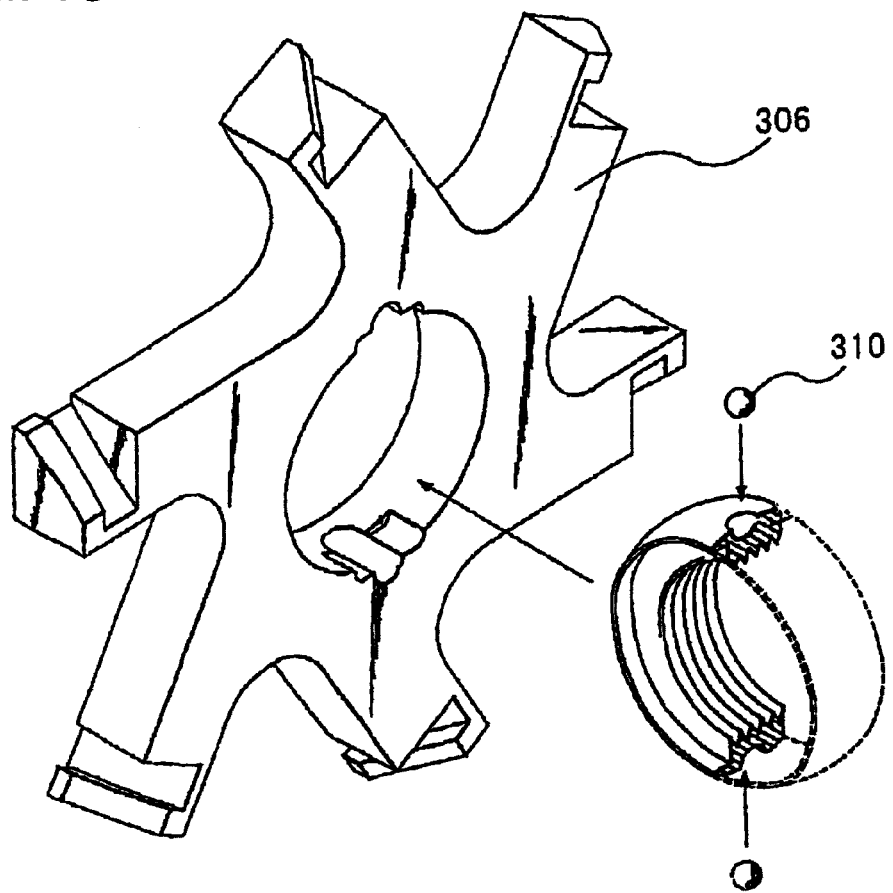
FIG. 13 is a side cross-sectional view illustrating a third related granulating apparatus.
Figure 14:
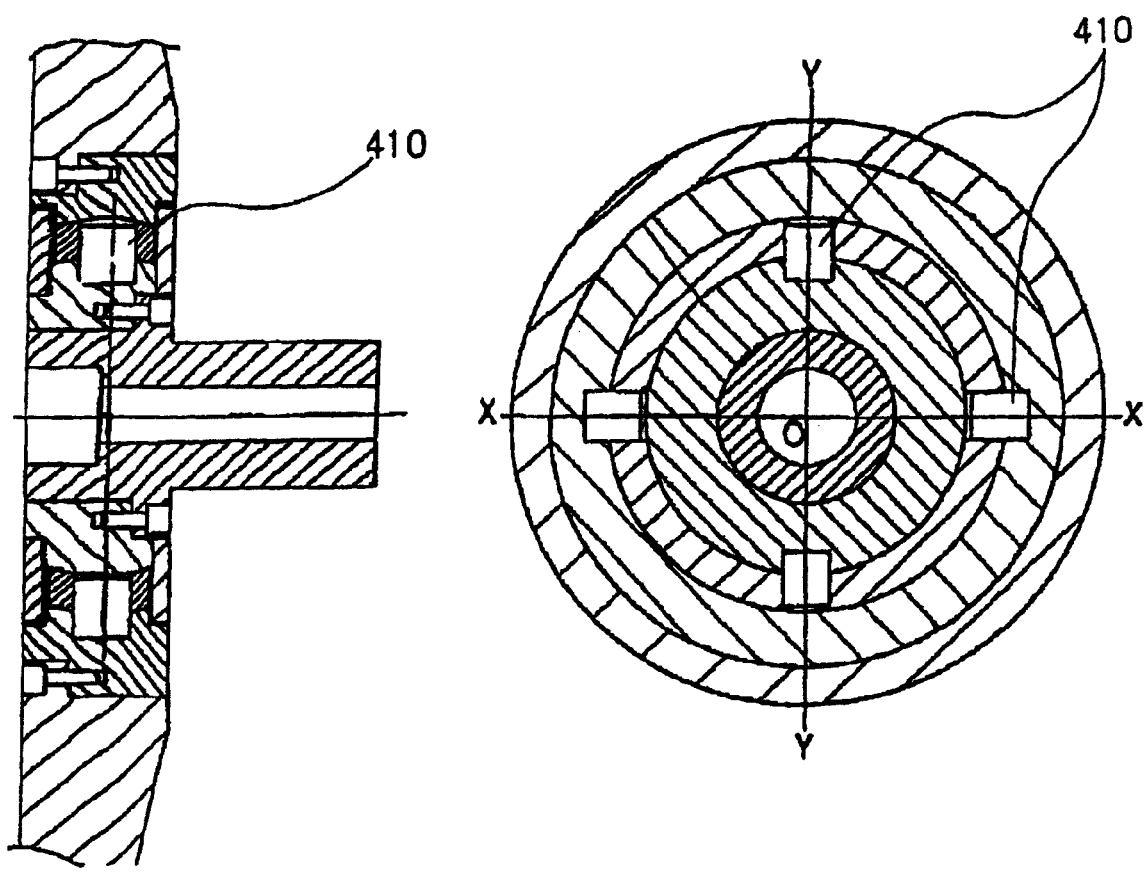
FIG. 14 is a side cross-sectional view illustrating a fourth related granulating apparatus.
Figure 15:
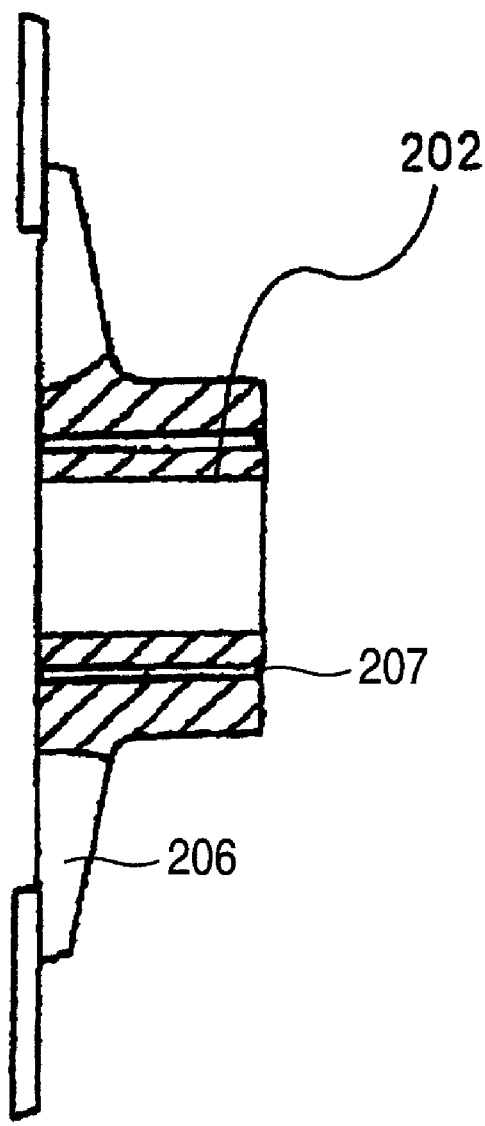
FIG. 15 is a side cross-sectional view illustrating another example of the fourth related granulating apparatus using a rubber bush as an aligning element.

Further, a cutout (not shown), into which the fixing holder 2 is inserted, is formed in the spherical cylinder 4 according to the present embodiment. Consequently, the fixing holder 2 can be inserted into the spherical cylinder 4. Another cutout (not shown), in which the spherical cylinder 4 can be inserted, is formed in the cutter holder 6. Incidentally, according to the invention, instead of the configuration provided with such a cutout, as shown in FIG. 7, each of the spherical cylinder 4 and the cutter holder 6 can be constructed so as to be dividable by an associated one of division faces 4g and 6g and as to be connected to the other of the spherical cylinder 4 and the cutter holder 6 with a bolt or the like. That is, after the fixing holder 2 is incorporated into the spherical cylinder 4 preliminarily divided into two pieces, the two pieces of the spherical cylinder 4 are combined with each other. Then, this spherical cylinder 4 is incorporated into the cutter holder 6 preliminarily divided into two pieces. Subsequently, the two pieces of the cutter holder 6 are combined with each other.

Further, the outer shape of each of the fixing holder 2 and the spherical cylinder 4 can be a truncated-cone-like shape whose side surface is a spherical.

With the aforementioned configurations, the fixing holder 2 and the spherical cylinder 4 are such that rotary torque of the fixing holder 2 can be transmitted to the spherical cylinder 4 by the surface contact. In addition, the fixing holder 2 and the spherical cylinder 4 are connected turnably to each other in a direction intersecting with a direction in which rotary torque of the fixing holder 2 is transmitted. That is, the fixing holder 2 and the spherical cylinder 4 are constructed so as to be turnable in the longitudinal direction of each of the keys 3 while torque is transmitted by the side surface of each of the keys 3.

Similarly, the spherical cylinder 4 and the cutter holder 6 are constructed so that rotary torque of the spherical cylinder 4 can be transmitted to the cutter holder 6 by surface contact. In addition, the spherical cylinder 4 and the cutter holder 6 are connected turnably to each other in a direction intersecting with a direction in which rotary torque of the spherical cylinder 4 is transmitted. That is, the cutter holder 6 and the spherical cylinder 4 are constructed so as to be turnable in the longitudinal direction of each of the keys 5 while torque is transmitted by the side surface of each of the keys 5.

Transmission of a rotation driving force by the driving force transmission mechanism of the cutter device 50 according to the present embodiment will be described hereinafter.

A rotation driving force of the cutter shaft 1 rotationally driven by a rotation driving means (not shown) is first transmitted from a side surface of the key 1a to that of each of the key grooves 2a of the fixing holder 2. Then, the rotation driving force transmitted to the fixing holder 2 is transmitted from a side surface of each of a pair of the keys 3 to that of each of a pair of the key grooves 4e. Furthermore, the rotation driving force transmitted to the spherical cylinder 4 is transmitted from a side surface of each of a pair of the keys 5 to that of a pair of the key grooves 6e of the cutter holder 6. That is, according to the cutter device 50 of the invention, a rotation driving force is transmitted utilizing surface contact. Consequently, transmission of large torque can be achieved.

Further, in the present embodiment, a load acting in the shaft center direction of the cutter device 50 is transmitted by the two contact spherical surfaces 11 and 12 (see FIG. 1A) from the fixing holder 2 to the cutter holder 6 through the spherical cylinder 4. Practically, a small gap is provided between the contact surfaces. Thus, when an applied load is small, the contact therebetween is line contact. However, when the applied load is large, the spherical surfaces are slightly deformed by the action of the elastic deformation. Thus, the load is transmitted utilizing surface contact. Consequently, this action enables the contact surfaces to withstand a large load applied thereto.

Thus, in the cutter device 50 of the invention, the torque transmission portion is constructed to utilize the surface contact of the key surface. Consequently, large rotary torque can be transmitted. Further, the cutter device 50 of the invention has a structure in which the fixing holder 2, the spherical cylinder 4, and the cuter holder 6 are held each other on spherical surfaces utilizing the surface contact. Consequently, a load applied in the direction of the rotational axis can be received by the spherical surfaces thereof. Thus, according to the cutter device 50 of the invention, functional decomposition is implemented as follows. That is, rotary torque is transmitted by the side surfaces of the keys 3 and 5. On the other hand, the axial load is received by each of the spherical surfaces. Consequently, no overload is applied to the portions for transmitting rotary torque. Accordingly, large torque can be transmitted. In addition, the cutter device 50 of the invention can be used for a long term.

The aligning element of the driving force transmission mechanism will be described hereinafter.

As illustrated in FIG. 1B, in a contact spherical surface 11 of each of the fixing holder 2 and the spherical cylinder 4, the keys 3 are arranged in Y-direction so as to slide-rotate around X-axis provided to pass through the center of the spherical surface. Further, in a contact spherical surface 12 of each of the spherical cylinder 4 and the cutter holder 6, the keys 5 are arranged in the X-direction so as to slide-rotate around the Y-axis provided to pass through the center of the spherical surface. The combination of the sliding motions of the two contact spherical surfaces 11 and 12 enables that the cutter blades 7 can freely hold the surface thereof with respect to rotation of the cutter shaft 1. That is, even when a right angle formed between a shaft 21 and a die surface 20a is not held, the cutter blade 7 can easily follow the die surface 20a.

Incidentally, a surface treatment for reducing the frictional coefficient of each of surfaces of the keys 3 and 5 and the key grooves 4e and 6e, e.g., Teflon (registered trademark) treatment, or coating with molybdenum can be performed thereon. The application of such a surface treatment can suppress reduction in torque transmission efficiency. In addition, the life of components can be increased.

In the foregoing description of the cutter device 50 according to the present embodiment, it has been described that a component constructed by fitting the keys 3 into the key grooves 2d of the fixing holder 2 is used as a fixing-holderside engaging portion, that this fixing-holder-side engaging portion is put into surface contact with the key grooves 4*e* serving as a first spherical-cylinder-side engaging portion of the spherical cylinder 4. Alternatively, the cutter device can be modified such that the key grooves 2*d* of the fixing holder 2 is used as the fixing-holder-side engaging portion, while a component constructed by fitting the keys 3 into the key grooves 4*e* of the spherical cylinder 4 is used as the first spherical-cylinder-side engaging portion.

That is, as long as rotary torque of the fixing holder 2 can be transmitted to the spherical cylinder 4 utilizing the surface contact, and the fixing holder 2 and the spherical cylinder 4 are connected to each other slidably in a direction intersecting with a direction in which the rotary torque of the fixing holder 2 is transmitted, any configuration can be employed. For example a spline connection can be employed instead of the key connection.

Further, in the foregoing description of the present invention, it has been described that a component constructed by fitting the keys 5 into the key grooves 4*d* of the spherical cylinder 4 is used as a second spherical-cylinder-side engaging portion, and that the second spherical-cylinder-side engaging portion is put into surface contact with the key grooves 6*e* serving as a cutter-holder-side engaging portion. However, the cutter device can be modified such that the key grooves 4*d* of the spherical cylinder 4 is used as the second spherical-cylinder-side engaging portion, while a component constructed by fitting the keys 5 into the key grooves 6*e* of the cutter holder 6 is used as the cutter-holder-side engaging portion.

The relationship between the spherical cylinder 4 and the cutter holder 6 is similar to the aforementioned relationship between the fixing holder 2 and the spherical cylinder 4. That is, as long as the rotary torque of the spherical cylinder 4 can be transmitted to the cutter holder 6 by the surface contact, and in addition, the spherical cylinder 4 and the cutter holder 6 are connected to each other slidably in a direction intersecting with a direction in which the rotary torque of the spherical cylinder 4 is transmitted, any configuration can be employed.

What is claimed is:

1. A cutter device comprising:
   a cutter shaft;
   a fixing holder comprising:
   a first through hole that holds the cutter shaft; and
   a fixing-holder-side engaging portion on a spherical outer circumferential surface thereof;
   a spherical cylinder comprising:
   a second through hole, which includes a first spherical-cylinder-side engaging portion provided on an inner circumferential surface thereof, and which holds the fixing holder; and
   a second spherical-cylinder-side engaging portion provided on a spherical outer circumferential surface thereof at a position shifted around a rotational axis with respect to the first spherical-cylinder-side engaging portion; and
   a cutter holder comprising:
   a third through hole, which includes a cutter-holder-side engaging portion provided on an inner circumferential surface thereof, and which holds the spherical cylinder; and
   a plurality of cutter blades for cutting resin,
   wherein the fixing holder and the spherical cylinder are connected to each other by keys having side surfaces cooperating with side surfaces of associated key grooves to provide a surface contact between the fixing-holder-side engaging portion and the first spherical-cylinder-side engaging portion so that rotary torque of the fixing holder is transmittable to the spherical cylinder, the keys configured to slide linearly along the associated key grooves in a direction intersecting with a direction in which the rotary torque of the fixing holder is transmitted, and
   wherein the spherical cylinder and the cutter holder are connected to each other by surface contact between the second spherical-cylinder-side engaging portion and the cutter-holder-side engaging portion so that rotary torque of the spherical cylinder is transmittable to the cutter holder, the spherical cylinder and the cutter holder being turnable to each other in a direction intersecting with a direction in which the rotary torque of the spherical cylinder is transmitted.

2. The cutter device according to claim 1, wherein at least one of the inner circumferential surface of the spherical cylinder and the inner circumferential surface of the cutter holder have a spherical surface.

3. The cutter device according to claim 1, wherein at least one of an end part of the inner circumferential surface of the spherical cylinder and an end part of the inner circumferential surface of the cutter holder have a truncated-cone-like shape.

4. The cutter device according to claim 1, wherein a connection between the second spherical-cylinder-side engaging portion and the cutter-holder-side engaging portion are a key-connection.

5. The cutter device according to claim 1, wherein a connection between the second spherical-cylinder-side engaging portion and the cutter-holder-side engaging portion are a spline-connection.

6. The cutter device according to claim 1, wherein an outer shape of each of the fixing holder and the spherical cylinder has a truncated-cone-like shape, the side surface of which has a spherical shape.

7. The cutter device according to claim 1, wherein each of the fixing-holder-side engaging portion and the first spherical-cylinder-side engaging portion has a torque transmission sliding surface, each of which slides on one another so as to transmit rotary torque of the fixing holder from the fixing-holder-side engaging portion to the first spherical-cylinder-side engaging portion,
   wherein each of the second spherical-cylinder-side engaging portion and the cutter-holder-side engaging portion has a torque transmission sliding surface, each of which slides on one another so as to transmit rotary torque of the spherical cylinder from the second spherical-cylinder-side engaging portion to the cutter-holder-side engaging portion, and
   wherein a surface treatment for reducing a frictional coefficient of a surface is performed on respective torque transmission sliding surfaces.

* * * * *